US 8,271,621 B2

(12) United States Patent
Wu

(10) Patent No.: US 8,271,621 B2
(45) Date of Patent: Sep. 18, 2012

(54) METADATA COMMUNICATION SYSTEM

(75) Inventor: Yuwen Wu, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 562 days.

(21) Appl. No.: 11/800,463

(22) Filed: May 4, 2007

(65) Prior Publication Data

US 2008/0275994 A1    Nov. 6, 2008

(51) Int. Cl.
G06F 15/177 (2006.01)
(52) U.S. Cl. ........ 709/220; 709/227; 709/230; 709/236; 709/237
(58) Field of Classification Search .................. 709/220, 709/27, 230, 236, 232
See application file for complete search history.

(56) References Cited

U.S. PATENT DOCUMENTS

| 5,706,434 | A * | 1/1998 | Kremen et al. ............... 709/218 |
| 2002/0052966 | A1* | 5/2002 | Isomura et al. ............... 709/230 |
| 2002/0161757 | A1* | 10/2002 | Mock et al. ........................ 707/5 |
| 2004/0088423 | A1* | 5/2004 | Miller et al. .................. 709/229 |
| 2004/0162918 | A1* | 8/2004 | Freidman et al. ............. 709/246 |
| 2007/0088814 | A1 | 4/2007 | Torii |
| 2007/0118496 | A1* | 5/2007 | Bornhoevd et al. ............... 707/1 |
| 2007/0150478 | A1* | 6/2007 | Cho et al. ........................ 707/10 |

FOREIGN PATENT DOCUMENTS

EP    1 764 689    3/2007

OTHER PUBLICATIONS

Microsoft, "PNP-X Implementer's Guide", Apr. 19, 2005, retrieved from http://download.microsoft.com/download/5/D/6/5D6EAF2B-7DDF-476B-93DC-7CF0072878E6/PnP-X__imp.doc on Jun. 10, 2010.*
European Patent Office, "European Search Report", Foreign application No. 08251609.7-2413, dated Sep. 22, 2008, 5 pages.
Albright, Shivaun, et al., "PrintEnhanced: 1 Service Template Version 1.01 for UPnP Version 1.0", Contributing Members of the UPnP Forum, Standardized DCP, retrieved from website <http://www.upnp.org/standardizeddcps/documents/Service__PrintEnhanced__v1__050504__000.pdf>, dated May 4, 2005, 81 pages.
Albright, Shivaun, et al., "Printer: 1 Device Template Version 1.01 for UPnP Version 1.0", Contributing Members of the UPnP Forum, Approved Standard, retrieved from website <http://www.upnp.org/standardizeddcps/documents/Printer__Definition__v1__020808.pdf>,dated Aug. 8, 2002, 7 pages.
Alexander, Jan, et al., "Web Services Transfer (WS-Transfer)", W3C Member Submission 27, retrieved from website <http://www.w3.org/Submission/WS-Transfer/>, dated Sep. 2006, 17 pages.

* cited by examiner

Primary Examiner — Liangche A Wang
(74) Attorney, Agent, or Firm — Hickman Palermo Truong Becker Bingham Wong LLP

(57) ABSTRACT

Techniques for communicating metadata are disclosed. According to one technique, a device comprises a configuration module. The configuration module contains and specifies a mapping table. For example, each mapping in the mapping table might indicate a standard, a retrieving protocol, and a packaging protocol. In the mapping table, a particular retrieving or packaging protocol can be mapped to more than one standard. The device comprises one or more separately implemented retrieving protocol modules and packaging protocol modules. The device receives a client's request. The device selects a retrieving protocol to interpret the request, and interprets the request using that protocol. The device uses the mapping table to determine a packaging protocol that is mapped to the client's standard. The device uses the selected packaging protocol to package, in the appropriate form, the requested metadata. The device sends the appropriately packaged metadata back to the client.

16 Claims, 4 Drawing Sheets

| RETRIEVING PROTOCOL 202 | PACKAGING PROTOCOL 204 | STANDARD 206 | CHARACTERISTICS 208 |
|---|---|---|---|
| WS-TRANSFER | WS-DEVICE PROFILE | WSD | TCP PORT 1600 |
| HTTP GET | DEVICE TEMPLATE | UPNP | TCP PORT 1700 |
| ... | ... | ... | ... |

METADATA COMMUNICATION SYSTEM

FIELD OF THE INVENTION

The invention relates to metadata, and more specifically, to a technique for communicating a device's metadata to a client using retrieving and packaging protocols.

BACKGROUND OF THE INVENTION

Printing devices are devices that can print viewable content on physical media, such as paper or transparent sheets. Printing devices include printers and multi-function peripherals (MFPs) such as the Ricoh Aficio 5560 system. Typically, a printing device receives data from a computer via a network or cable. The printing device prints text/or and images that are represented by the data.

Different printing devices may offer different features. Different printing devices may have different characteristics and capabilities. It is often useful for a client, such as an application program (e.g., a word processor) or print driver, to be able to obtain information about a printing device with which that client intends to interact. For example, if a printing device can print in either black and white or in color, then it may be useful for a client to know that the printing device has such a capability. Knowing that a printing device has the ability to print in color might influence the kind of commands that the client sends to the printing device.

In order to enable clients to learn the features, characteristics, and capabilities of a printing device, some printing devices store (e.g., in volatile or non-volatile memory) metadata that indicates features, characteristics, and capabilities of those printing devices. A client can send, to such a printing device, a request for that printing device's metadata. The printing device can receive such a request and respond to the request by sending, to the client, the printing device's metadata (or a specifically requested portion thereof). The client can receive the metadata and use the metadata to customize the manner in which the client interacts with the printing device. Thus, a client can automatically learn about a printing device's features, characteristics, and capabilities.

A device's metadata might indicate information such as the device's manufacturer, the device's model, the device's Internet Protocol (IP) address, etc. Under some circumstances, a client might be unable to interact in a desired manner with a printing device until the client has obtained at least some of the printing device's metadata.

Typically, a client requests metadata from a printing device in a manner that conforms to a specified "retrieving protocol." The retrieving protocol may indicate, for example, the form and/or order of messages that a client ought to send to a printing device in order to request or retrieve that printing device's metadata. If a client and a printing device do not follow a mutually understood retrieving protocol, then the printing device might not be able to recognize what the client wants from the printing device.

Additionally, a printing device typically sends metadata to a client in a manner that conforms to a specified "packaging protocol." The packaging protocol may indicate, for example, the form and/or structure that the metadata ought to take when sent to the client. For example, a packaging protocol might indicate that metadata should be sent as plain text, or in a comma-delimited format, or as an Extensible Markup Language ("XML") document that conforms to a specified schema. If a client and a printing device do not follow a mutually understood packaging protocol, then the client might not be able to recognize what is meant by the metadata that the printing device sends to the client.

Some retrieving protocols and packaging protocols are specifically designed to enable a client to obtain a device's metadata over a network, or even over a series of interconnected networks such as the Internet. Using such protocols, a client can automatically discover the features, characteristics, and capabilities of devices even if those devices are miles away, so long as both the client and those devices are connected to the Internet.

Different clients may conform to different standards. The retrieving and packaging protocols that a client uses to obtain and interpret metadata may vary depending upon the standard to which the client conforms. Clients that conform to the Universal Plug and Play ("UPNP") standard typically use Hypertext Transfer Protocol ("HTTP") Get as a retrieving protocol and a device template protocol as a packaging protocol. In contrast, clients that conform to the Web Service Device ("WSD") standard now typically use the WS-Transfer protocol (specified by the World Wide Web Consortium) as a retrieving protocol and the WS-Device Profile protocol (also specified by the World Wide Web Consortium) as a packaging protocol.

In order to be able to communicate metadata to a variety of different types of clients, a printing device might comprise a different module for each different possible standard to which a client might conform. For example, a printing device might comprise both (a) a UPNP module that receives and responds to metadata requests from clients that conform to the UPNP standard ("UPNP clients") and (b) a WSD module that receives and responds to metadata requests from clients that conform to the WSD standard ("WSD clients"). The UPNP module might use HTTP GET and a device template protocol, while the WSD module might use the WS-Transfer and WS-Device Profile protocols, for example. Each module might be implemented as a different sequence of machine-executable instructions.

Although the above approach would have its uses, the above approach also would suffer somewhat due to inflexibility. Initially, clients that conform to a particular standard might all use a particular retrieving protocol and a particular packaging protocol (as dictated by the particular standard). However, over time, as newer and better protocols become available, existing protocols tend to evolve to dictate the use of the newer protocols instead of the older protocols. Thus, later, those same clients that conform to the particular protocol might evolve to use a newer, better, retrieving protocol (but such clients might continue to use the original packaging protocol). Under such circumstances, a printing device's module that implemented the original retrieving and packaging protocols in a tightly coupled manner would no longer be usable to communicate metadata to clients that conformed to the particular standard. Under such circumstances, a new module that implemented both the original packaging protocol and the new retrieving protocol might need to be created and installed on the printing device in order to enable the printing device to receive and respond to metadata requests from such clients.

Additionally, if there were no other standard that still used both the original retrieving and packaging protocols together, then the module that implemented both the original retrieving and packaging protocols would become obsolete and useless. Sadly, this would be the case even if some other standard still used the original retrieving protocol (but not the original packaging protocol) and even if some other standard still used the original packaging protocol (but not the original retrieving protocol).

Similar troubles might arise in the event that an entirely new standard was published and widely adopted by clients. Such a new standard might even use existing retrieving and packaging protocols, but such a new standard might use a different combination of existing retrieving and packaging protocols than any combination used by any other previous standard. It might be that no module for any existing standard implemented the particular combination of existing retrieving and packaging protocols together. Under such circumstances, an entirely new module for the new standard might need to be created and installed on the printing device even though the existing retrieving and packaging protocols has previously been implemented within existing modules (just never together in the same module).

Thus, if used, the above approach might, over time, necessitate the expenditure of a large amount of time and effort by those who create modules for the printing device. Additionally, if used, the above approach might, over time, produce large quantities of obsolete, un-reusable code.

Furthermore, given a sufficiently large number of different retrieving protocols and a sufficiently large number of different packaging protocols (all of which might concurrently be used by different standards, but in different combinations), the number of different possible combinations of retrieving and packaging protocols could become overwhelmingly enormous. If a printing device was required to maintain a separate module for each different combination, and if each module fully implemented both a retrieving protocol and a packaging protocol, then the amount of memory and/or persistent storage space that the printing device would need in order to maintain those modules might be significant.

The above approach, if used, could be very wasteful of printing device resources and human programming effort. Based on the foregoing, there is a need for a less wasteful approach for communicating metadata between devices and the diverse kinds of clients that interact with those devices.

SUMMARY OF THE INVENTION

Systems and methods for communicating a device's metadata to a client are disclosed. In one embodiment of the invention, a device (e.g., a printing device) comprises a configuration module. The configuration module contains and specifies a mapping table. In one embodiment of the invention, each mapping in the mapping table indicates at least (a) a standard (e.g., UPNP, WSD, etc.), (b) a retrieving protocol for that standard, and (c) a packaging protocol for that standard. Each mapping may also indicate a set of characteristics. In the mapping table, a particular retrieving or packaging protocol can be mapped to more than one standard. In an alternative embodiment of the invention, each mapping in the mapping table indicates at least (a) a packaging protocol, (b) a retrieving protocol, and (c) a set of characteristics that can be used to identify and dispatch a client's request; the "standard" is optional.

The device additionally comprises a separate retrieving protocol module for each unique retrieving protocol specified in the mapping table, and a separate packaging protocol module for each unique packaging protocol specified in the mapping table. The retrieving protocol modules are implemented separately from the packaging protocol modules. As a result, no more than one module for any particular retrieving protocol or any particular packaging protocol needs to be implemented on the device, regardless of the number of standards that use that protocol.

According to one embodiment of the invention, a device receives a request that originated from a client. The device determines, based on some characteristic(s) of the request, a retrieving protocol that the device should use to interpret the request. The device interprets the request using the selected retrieving protocol. The device also determines, based on some characteristic(s) of the request, a standard to which the client conforms. The device uses the mapping table to determine a packaging protocol that is mapped to the standard. The device uses the selected packaging protocol to package, in the appropriate form, the requested metadata. The device sends the appropriately packaged metadata back to the client.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION OF THE INVENTION

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Overview

Systems and methods for communicating a device's metadata to a client are disclosed. In one embodiment of the invention, a device (e.g., a printing device) comprises a configuration module. The configuration module contains and specifies a mapping table. In one embodiment of the invention, each mapping in the mapping table indicates at least (a) a standard (e.g., UPNP, WSD, etc.), (b) a retrieving protocol for that standard, and (c) a packaging protocol for that standard. In the mapping table, a particular retrieving or packaging protocol can be mapped to more than one standard.

The device additionally comprises a separate retrieving protocol module for each unique retrieving protocol specified in the mapping table, and a separate packaging protocol module for each unique packaging protocol specified in the mapping table. The retrieving protocol modules are implemented separately from the packaging protocol modules. As a result, no more than one module for any particular retrieving protocol or any particular packaging protocol needs to be implemented on the device, regardless of the number of standards that use that protocol.

According to one embodiment of the invention, a device (e.g., a printing device) receives a request that originated from a client. The device determines, based on some characteristic(s) of the request, a retrieving protocol that the device should use to interpret the request. The device interprets the request using the selected retrieving protocol. The device also determines, based on some characteristic(s) of the request, a standard to which the client conforms. The device uses the mapping table to determine a packaging protocol that is mapped to the standard. The device uses the selected packaging protocol to package, in the appropriate form, the requested metadata. The device sends the appropriately packaged metadata back to the client.

Example Metadata Communication System

Figure 1:
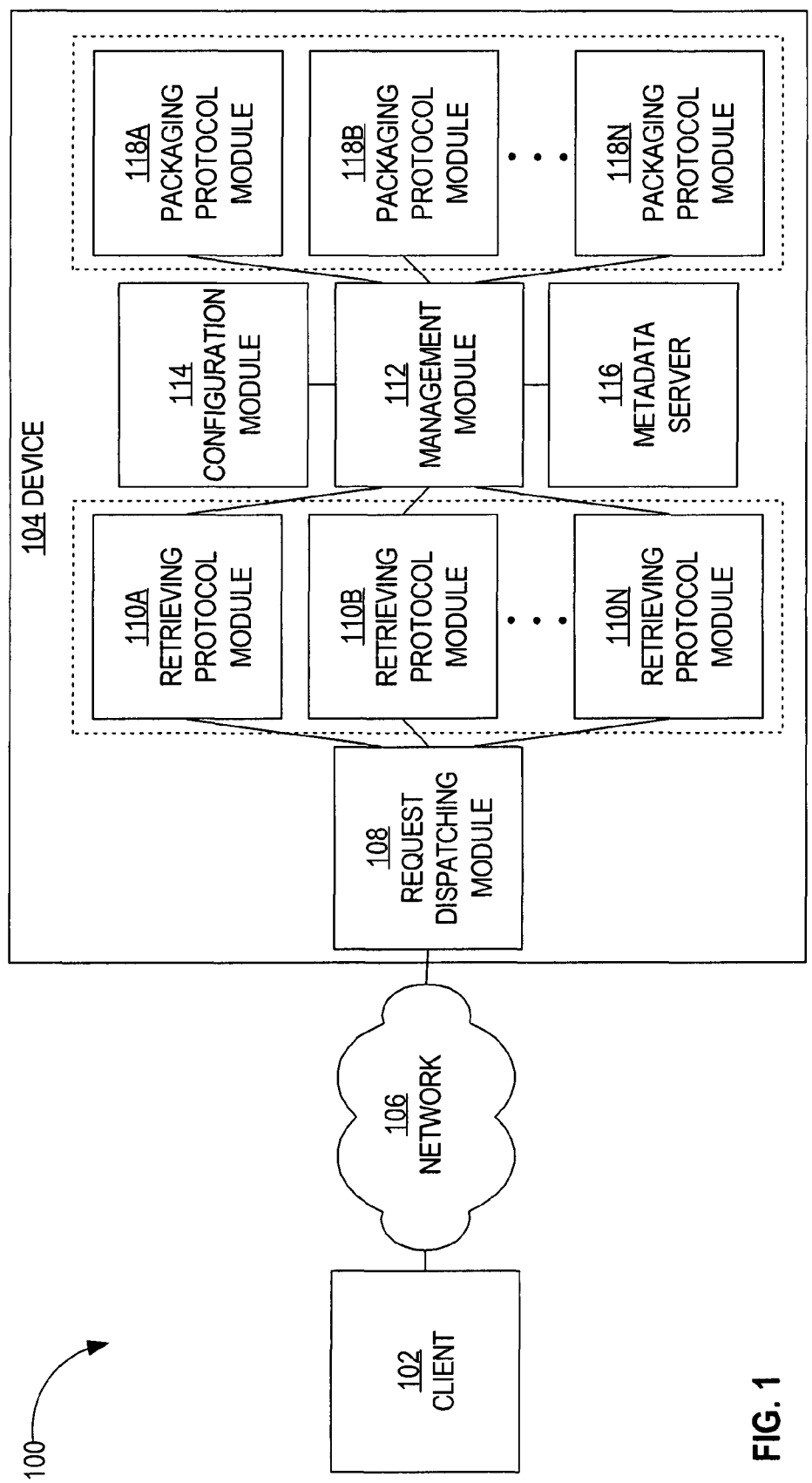
FIG. 1 is a block diagram that illustrates an example of a system for communicating a device's metadata to a client, according to an embodiment of the invention.

FIG. 1 is a block diagram that illustrates an example of a system for communicating a device's metadata to a client, according to an embodiment of the invention. According to the embodiment illustrated, system 100 comprises a client 102 and a device 104. Alternative embodiments of the invention may include more, fewer, or different components than those illustrated in FIG. 1.

Client 102 is communicatively coupled or connected to device 104 via a network 106. Network 106 might comprise a local area network ("LAN"), a wide area network ("WAN"), and/or a series of interconnected networks. The Internet is an example of such a series of interconnected networks. Thus, in one embodiment of the invention, client 102 communicates with device 104 via the Internet.

In one embodiment of the invention, client 102 is an application program such as a word processor or some other application program that generates data that can be processed and/or consumed by device 104. For example, client 102 might be a computer-executable program that generates print data for device 104 to render and print on physical media such as paper or transparency sheets. In an alternative embodiment of the invention, client 102 is a print driver. Client 102 may be any mechanism that requests and receives metadata from device 104. Depending on the type of client 102, client 102 might conform to and operate according to any one of a number of different standards (e.g., WSD, UPNP, etc.).

In one embodiment of the invention, device 104 is a printing device such as a printer or an MFP. In alternative embodiments of the invention, device 104 might be a copying machine, a scanner, a camera, or an appliance of some kind. Device 104 may be any mechanism or system that receives, from client 102, requests for metadata, and responds to such requests with metadata about device 104.

In one embodiment of the invention, device 104 comprises a request dispatching module 108, a set of retrieving protocol modules 110A-N, a management module 112, a configuration module 114, a metadata server 116, and a set of packaging protocol modules 118A-N. Each module discussed herein may be, but does not necessarily need to be, implemented as a separate sequence of machine-executable instructions. In one embodiment of the invention, one or more processors (not shown) present within device 104 execute such sequences of instructions at various times to cause device 104 to perform the functionality that the sequences of instructions indicate. For example, retrieving protocol modules 110A-N and packaging protocol modules 118A-N may be implemented as separate code libraries.

Separated Retrieving and Packaging Protocol Modules

According to one embodiment of the invention, each of retrieving protocol modules 110A-N implements a different retrieving protocol. Similarly, according to one embodiment of the invention, each of packaging protocol modules 118A-N implements a different packaging protocol. A particular retrieving protocol may be implemented in as few as one of retrieving protocol modules 110A-N. Similarly, a particular packaging protocol may be implemented in as few as one of packaging protocol modules 118A-N. Because the implementations of retrieving and packaging protocols do not need to be implemented more than once, memory and storage space required to maintain those protocols on device 104 is reduced.

According to one embodiment of the invention, retrieving protocol modules 110A-N are separate and decoupled from packaging protocol modules 118A-N. As a result of this separation and decoupling, any retrieving protocol implemented by any of retrieving protocol modules 110A-N can be used in conjunction with any packaging protocol implemented by any of packaging protocol modules 118A-N. Indeed, a particular retrieving protocol may be used in conjunction with multiple different packaging protocols, and a particular packaging protocol may be used in conjunction with multiple different retrieving protocols.

In one embodiment of the invention, although retrieving protocol modules 1110A-N implement different retrieving protocols, each of these modules has a standard interface through which other entities communicate with those modules. In such an embodiment of the invention, the interface does not vary between modules. The interface may be implemented as one or more methods of an application programming interface ("API"), for example. Similarly, in one embodiment of the invention, although packaging protocol modules 118A-N implement different packaging protocols, each of these modules has a standard interface through which other entities communicate with those modules. Additionally, in one embodiment of the invention, management module 112 has (a) one standard interface through which retrieving protocol modules 110A-N communicate with management module 112, and (b) another standard interface through which packaging protocol modules 118A-N communicate with management module 112.

Configuration Module

According to one embodiment of the invention, configuration module 114 maintains a mapping table. In one embodiment of the invention, each mapping in the mapping table indicates at least (a) a standard, (b) a retrieving protocol for that standard, and (c) a packaging protocol for that standard. However, in variant embodiments of the invention, the mappings may contain more, fewer, and/or different items of information than those described above. For example, in one embodiment of the invention, each mapping additionally includes a set of characteristics that can be used to identify and dispatch a client's request. For another example, in one embodiment of the invention, mappings in the mapping table do not indicate any "standard." A developer of device 104 can set up and configure the mapping table during the development phase of device 104 based on the standards that device 104 needs to support and the protocols that have been implemented.

For example, if the packaging protocol that is used by a particular standard changes, then, in later versions of device 104, a developer can modify the mapping for the particular standard at development time so that the mapping maps the particular standard to the new packaging protocol instead of the old packaging protocol to which the particular standard was previously mapped. Under such circumstances, if a packaging protocol module for the new packaging protocol were already implemented on device 104 (as might be the case if some other standard were already mapped to the new packaging protocol), then there would be no need to install or implement any new module or protocol on device 104.

For another example, if a new, previously unknown standard emerges, and if that new standard uses already-known retrieving and packaging protocols for which corresponding retrieving and packaging protocol modules already exist on device 104, then, in later versions of device 104, a developer can add, to the mapping table, at development time, a new mapping between the new standard and the existing, already-implemented retrieving and packaging protocols. Thereafter, later versions of device 104 can appropriately process requests from clients that use the new standard, even if no previous standard used the same combination of retrieving and packaging protocols that the new standard uses. Under such circumstances, the foregoing may be accomplished without installing or implementing any new module or protocol on later versions of device 104.

In one embodiment, each mapping in the mapping table additionally indicates information that identifies one or more characteristics that are typically associated with requests that originate from clients that conform to the standard that is indicated in that mapping. Such information may be used to identify the standard to which an incoming request corresponds. For example, such information might comprise a Transmission Control Protocol (TCP) port number on which device 104 will receive requests that correspond to the mapping's standard; under such circumstances, requests that device 104 receives on that TCP port will be deemed to correspond to the standard that is mapped to that TCP port. For another example, such information might comprise a control string that will be contained in requests that correspond to the mapping's standard; under such circumstances, requests that contain that control string will be deemed to correspond to the standard that is mapped to that control string.

An example of a mapping table is described below.

Example Mapping Table

Figure 2:
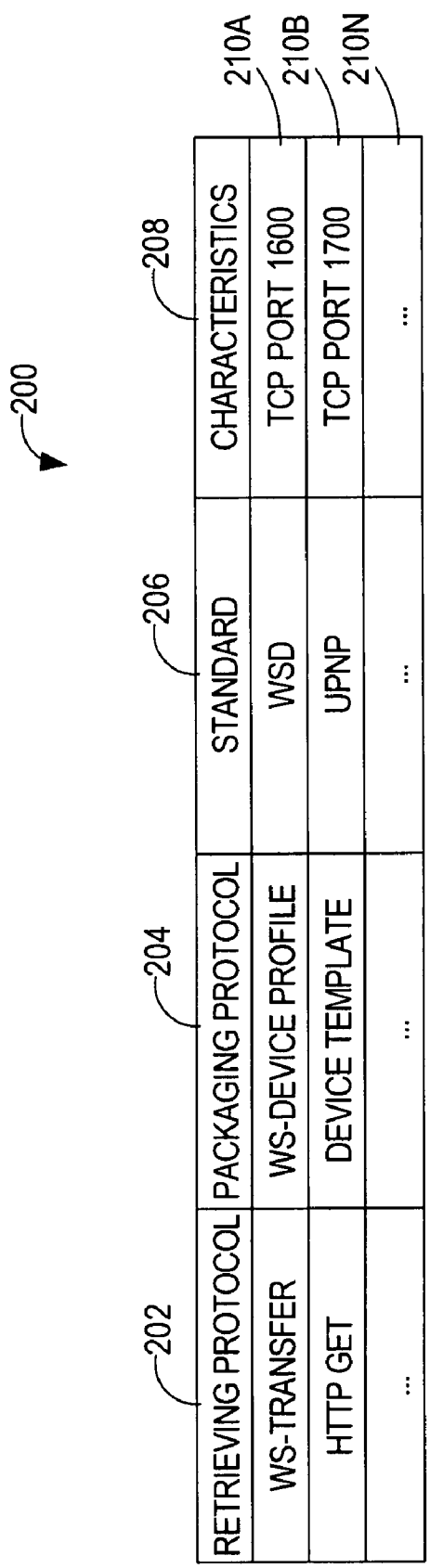
FIG. 2 is a block diagram that illustrates an example of a mapping table, according to an embodiment of the invention.

FIG. 2 is a block diagram that illustrates an example of a mapping table, according to an embodiment of the invention. Such a mapping table might be maintained and used by configuration module 114 to determine the packaging and retrieving protocols device 104 should use to respond to metadata requests from clients that conform to various standards. The mapping table may be stored on device 104 in the form of one or more user-modifiable configuration files, for example.

As shown in FIG. 2, mapping table 200 includes a retrieving protocol column 202, a packaging protocol column 204, a standard column 206, and a characteristics column 208. Mapping table 200 additionally includes mappings (i.e., entries or rows) 210A-N. In the example shown, mapping 210A maps the "WSD" standard to the "WS-Transfer" retrieving protocol and the "WS-Device Profile" packaging protocol. Mapping 210B maps the "UPNP" standard to the "HTTP GET" retrieving protocol and the "device template" packaging protocol. Under such circumstances, retrieving protocol modules 110A-N would include at least (a) one retrieving protocol module for the "WS-Transfer" retrieving protocol and (b) one retrieving protocol module for the "HTTP GET" retrieving protocol. Additionally, under such circumstances, packaging protocol modules 118A-N would include at least (a) one packaging protocol module for the "WS-Device Profile" packaging protocol and (b) one packaging protocol module for the "device template" packaging protocol.

Additionally, in the example embodiment illustrated in FIG. 2, mapping 210A maps the "WSD" standard to a "TCP Port 1600" characteristic. Mapping 210B maps the "UPNP" standard to a "TCP port 1700" characteristic. As a result, in one embodiment of the invention, when device 104 receives a client request, device 104 determines the standard to which the request (and the originating client) conforms based at least in part on the TCP port on which the client request arrived; in the present example, if the request arrived on TCP port 1600, then device 104 would deem the request to have originated from a client that conformed to the "WSD" standard (to which TCP port 1600 is mapped), but if the request arrived on TCP port 1700, then device 104 would deem the request to have originated from a client that conformed to the "UPNP" standard (to which TCP port 1700 is mapped). The standard to which the client and request conforms determines the retrieving and packaging protocols that device 104 will use to interpret the request and package the metadata that device 104 returns to the client.

An example of the operation of the system illustrated in FIG. 1 is described below.

Example Metadata Communication Technique

Figure 3:
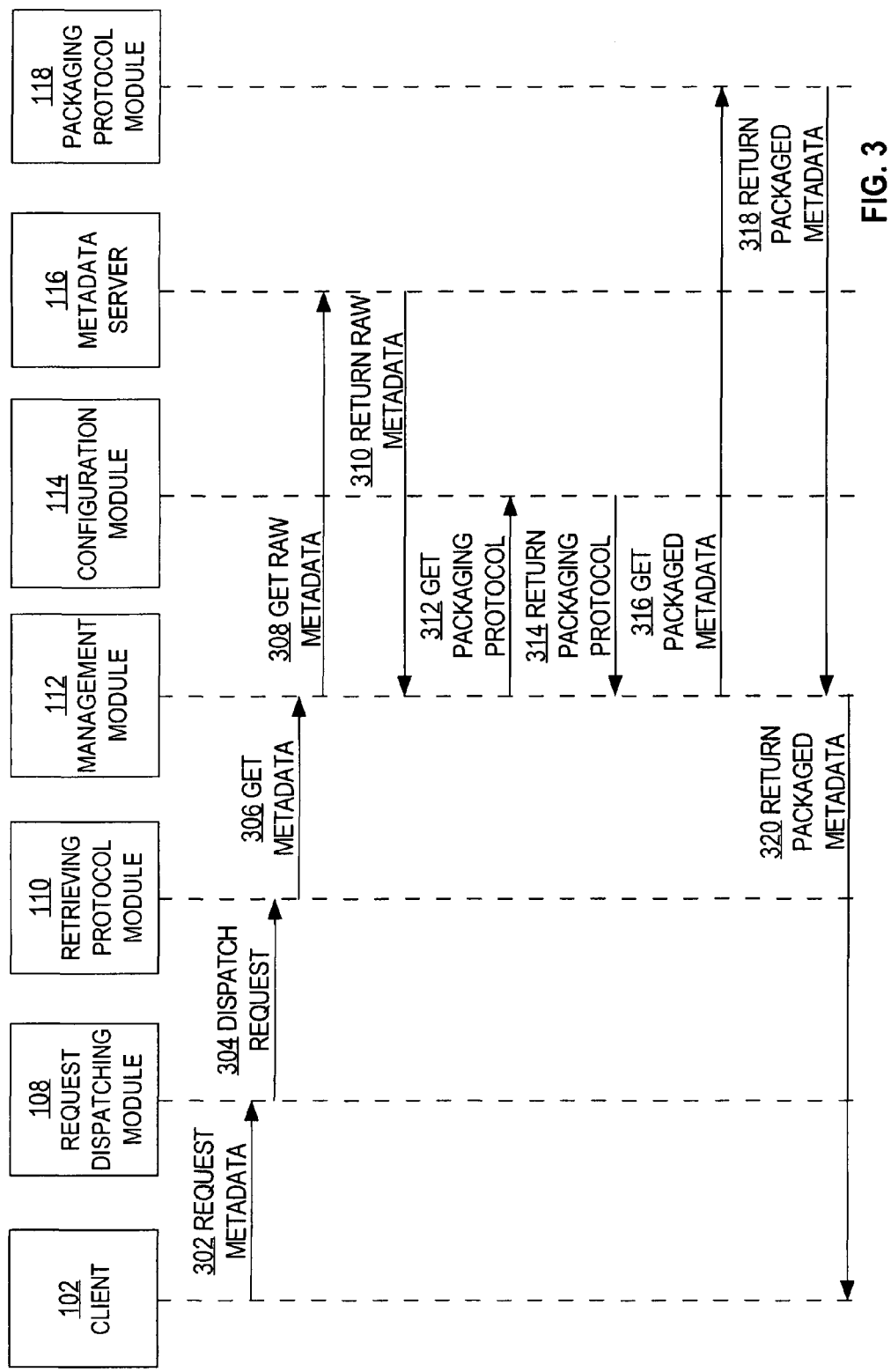
FIG. 3 is a sequence diagram that illustrates an example of a technique for communicating client-requested device metadata to a client using client-understood protocols.

FIG. 3 is a sequence diagram that illustrates an example of a technique for communicating client-requested device metadata to a client using client-understood protocols. Alternative embodiment of the invention may employ additional, fewer, or different steps than those illustrated in FIG. 3.

As shown in FIG. 3, in step 302, client 102 requests metadata from device 104 (shown in FIG. 1). The metadata request is formatted according to a retrieving protocol that is employed by a standard to which client 102 conforms. Request dispatching module 108, within device 104, receives the metadata request from client 102.

In step 304, request dispatching module 108 determines to which of retrieving protocol modules 110A-N the metadata request should be sent. In one embodiment of the invention, request dispatching module 108 picks one of retrieving protocol modules 110A-N based on the standard to which client 102 is deemed to conform.

In one embodiment of the invention, request dispatching module 108 determines this standard based on a characteristic of the request and/or a characteristic of the manner in which the request was received. For example, request dispatching module 108 might pick a retrieving protocol module based on the TCP port through which the metadata request was received; request dispatching module might look up the requests' TCP port in characteristics column 208 of mapping table 200 and determine the client's standard to be the standard to which that TCP port is mapped. For another example, request dispatching module 108 might pick a retrieving protocol module based on a control string that is present in the metadata request; request dispatching module might look for the control string in characteristics column 208 of mapping table 200 and determine the client's standard to be the standard to which that control string is mapped. For another example, request dispatching module 108 might pick a retrieving protocol module based on a combination of multiple different factors, such as a TCP port, a control string, and/or other factors.

After request dispatching module 108 has picked a particular retrieving protocol module from among retrieving protocol modules 110A-N, request dispatching module 108 dispatches the metadata request to the particular retrieving protocol module in step 304.

In step 306, the particular retrieving protocol module interprets the metadata request according to the retrieving protocol that the particular retrieving protocol module implements. The particular retrieving protocol module then forms and sends a protocol-independent "get metadata" request to management module 112. The "get metadata" request identifies the specific items of metadata (e.g., manufacturer, IP address, etc.) that were specified in the original metadata request from client 102, but does so in a manner that does not vary based on the retrieving protocol that was used to form the original metadata request. For example, the particular retrieving protocol may send the "get metadata" request to management module 112 by invoking a standard interface method of an API implemented by management module 112. Such a standard interface method may accept, as parameters, criteria for selecting specific items of requested metadata. Management module 112 receives the "get metadata" request from the particular retrieving protocol module.

In step 308, management module 112 sends, to metadata server 116, a request for the "raw" metadata that client 102 requested. The metadata is "raw" because the metadata has not yet been packaged or formatted according to any packaging protocol. Metadata server 116 receives the request for the "raw" metadata.

In step 310, metadata server 116 returns the requested "raw" metadata to management module 112. The returned metadata may comprise less than all of the available metadata maintained by metadata server 116, because client 102 might have requested only a subset of the available metadata about device 104. In one embodiment of the invention, the request that metadata server 116 receives from management module 112 describes a query or selection criteria, and metadata server 116 only returns the portions of the device-stored metadata that satisfy the query or the selection criteria. Management module 112 receives the "raw" metadata from metadata server 116.

In step 312, management module 112 sends, to configuration module 114, a request for the appropriate packaging protocol. In one embodiment of the invention, this request identifies the standard to which client 102 was previously deemed to conform, as is described above with reference to step 304. For example, the request might identify "WSD" or "UPNP" as the standard to which client 102 conforms. Configuration module 114 receives the request for the appropriate packaging protocol.

In step 314, configuration module 114 determines the identity of the appropriate packaging protocol and returns the identity of the appropriate packaging protocol to management module 112. In one embodiment of the invention, configuration module 114 determines the identity of the appropriate packaging protocol by finding, in mapping table 200, the standard that was identified in the request from management module 112, and returning, to management module 112, the identity of the packaging protocol to which that standard is mapped in mapping table 200. Using mapping table 200 of FIG. 2 as an example, if the identified standard is "WSD," then configuration module 114 may return, to management module 112, information that identifies "WS-Device Profile" as the appropriate packaging protocol. As another example, if the identified standard is "UPNP," then configuration module 114 may return, to management module 112, information that identifies "device template" as the appropriate packaging protocol. In any case, management module 112 receives the identity of the appropriate packaging protocol.

In step 316, management module 112 determines to which of packaging protocol modules 118A-N the "raw" metadata should be sent for packaging. In one embodiment of the invention, management module 112 picks the packaging protocol module that implements the appropriate packaging protocol that was identified by configuration module 114, as is described above with reference to step 314. After management module 112 has picked a particular packaging protocol module from among packaging protocol modules 118A-N, management module 112 send the "raw" metadata to the particular packaging protocol module in a request to get a packaged version of the metadata. The particular packaging protocol module receives the request and the "raw" metadata.

In step 318, the particular packaging protocol module packages the "raw" metadata according to the packaging protocol that the particular packaging protocol module implements. In so doing, the particular packaging module generates "packaged" metadata that conforms to the appropriate packaging protocol; client 102 will be able to understand this "packaged" metadata because client 102 understands the appropriate packaging protocol. In one embodiment of the invention, packaging the "raw" metadata involves formatting and/or annotating the "raw" metadata. For example, the particular packaging protocol module might package the "raw" metadata by enclosing individual metadata items in the "raw" metadata within various separate explanatory XML tag pairs. For another example, the particular packaging protocol module might package the "raw" metadata by delimiting individual metadata items in the "raw" metadata with various delimiting characters. After generating the "packaged" metadata, the particular packaging protocol returns the "packaged" metadata to management module 112. Management module 112 receives the "packaged" metadata.

In step 320, management module 112 returns the "packaged" metadata to client 102. For example, management module 112 may return the "packaged" metadata to client 102 via network 106 (and, potentially, through request dispatching module 108). Client 102 receives the "packaged" metadata and may use the metadata for various purposes. For example, client 102 may use the metadata to generate a user interface that indicates, to a user, various functions (as indicated in the metadata) that device 104 can perform, and/or various characteristics of device 104. For another example, client 102 may use the metadata to format further communications (e.g., print commands) between client 102 and device 104.

Implementation Mechanisms

Figure 4:
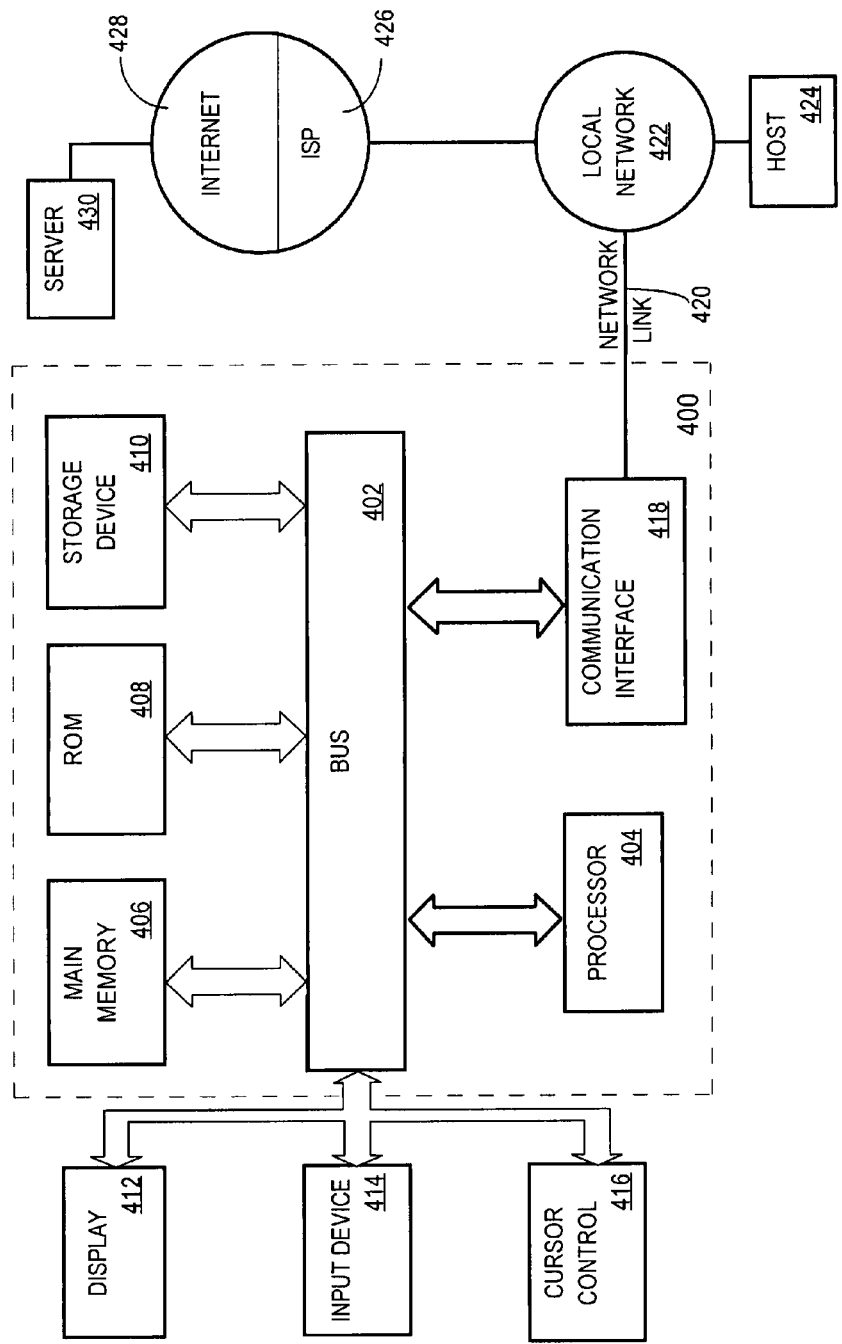
FIG. 4 is a block diagram that depicts a printing device upon which an embodiment of the invention may be implemented.

FIG. 4 is a block diagram that depicts a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a liquid crystal display (LCD), for displaying information to a user. An input device 414, including alphanumeric and other keys, is coupled to bus 402 for communicating information and command selections to processor 404. Another type of user input device is cursor control 416, such as a mouse, trackball, stylus, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 in a wireless communications architecture. According to one embodiment of the invention, wireless communications are provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a LAN card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the Internet 428. Local network 422 and Internet 428 both use electrical, electromagnetic or optical signals that carry digital data streams.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for configuring a monitoring system to monitor selected network elements as described herein. Processor 404 may execute the received code as it is received and/or stored in storage device 410 or other non-volatile storage for later execution.

In the foregoing specification, specific embodiments of the invention have been described. However, various modifications and changes may be made to such embodiments of the invention without departing from the broader spirit and scope of the invention. The specification and drawings are, accordingly, to be regarded in an illustrative rather than a restrictive sense.

What is claimed is:

1. A computer-implemented method for communicating metadata, the method comprising steps of:
   on a device:
      configuring a mapping table indicating a correspondence between a plurality of different retrieving protocols and a plurality of different packaging protocols;
      modifying the mapping table by modifying the correspondence between one or more protocols from the plurality of different retrieving protocols and one or more protocols from the plurality of different packaging protocols without installing or implementing any new protocol;
      receiving a metadata request from a client for the device to provide a description of capabilities of the device to the client;
      in response to receiving the metadata request, the device:
         selecting a particular retrieving protocol from among the plurality of different retrieving protocols; and
         selecting a particular packaging protocol from among the plurality of different packaging protocols.

2. The method of claim 1, further comprising:
   in response to receiving the metadata request, the device:
      interpreting a metadata request based on the particular retrieving protocol;
      selecting, based on the metadata request, a particular set of metadata about the device;
      wherein the particular set of metadata about the device indicates a plurality of capabilities specific to the device;
      selecting, from among a plurality of separately implemented packaging protocol modules, each having a same communication interface, and each being designed to package metadata according to a different packaging protocol, a particular packaging protocol module, wherein the particular packaging protocol module is designed to package metadata based on the particular packaging protocol and no other packaging protocol;
      sending the particular set of metadata to the particular packaging protocol module through the communication interface of the particular packaging protocol module to be packaged;
      wherein the particular packaging protocol module packages the particular set of metadata using the particular packaging protocol; and
      sending the packaged metadata, packaged by the particular packaging protocol module of the device, to the client to generate an interface specific for the device.

3. The method of claim 2, wherein the step of selecting the particular packaging protocol comprises:
   determining a particular standard to which the client conforms, wherein the particular standard is one of WSD and UPnP;
   locating, in the mapping table, a particular mapping;
   wherein the particular mapping identifies the particular standard; and
   selecting, as the particular packaging protocol, a packaging protocol identified in the particular mapping;
   wherein the particular set of metadata about the device further indicates a plurality of functions specific to the device.

4. The method of claim 3, wherein the particular packaging protocol is mapped to both WSD and UPnP in the mapping table.

5. The method of claim 2, wherein the particular retrieving protocol is mapped to multiple different packaging protocols in the mapping table maintained by the device.

6. The method of claim 2, wherein the step of selecting the particular retrieving protocol comprises:
  locating, in the mapping table, a characteristic associated with the metadata request; and
  selecting, as the particular retrieving protocol, a retrieving protocol identified in the particular mapping.

7. The method of claim 6, wherein the characteristic is an identity of a port on which the device received the metadata request.

8. The method of claim 6, wherein the characteristic is a control string contained within the metadata request.

9. A non-transitory computer-readable storage medium storing one or more sequences of instructions, wherein execution of the one or more sequences of instructions by one or more processors causes the one or more processors to perform the steps of:
  on a device:
    configuring a mapping table indicating a correspondence between a plurality of different retrieving protocols and a plurality of different packaging protocols;
    modifying the mapping table by modifying the correspondence between one or more protocols from the plurality of different retrieving protocols and one or more protocols from the plurality of different packaging protocols without installing or implementing any new protocol;
    receiving a metadata request from a client for the device to provide a description of capabilities of the device to the client;
    in response to receiving the metadata request, the device:
      selecting a particular retrieving protocol from among the plurality of different retrieving protocols; and
      selecting a particular packaging protocol from among the plurality of different packaging protocols.

10. The computer-readable storage medium of claim 9, further storing instructions which, when executed by the one or more processors, cause the one or more processors to perform the steps of:
  in response to receiving the metadata request, the device:
    interpreting a metadata request based on the particular retrieving protocol;
    selecting, based on the metadata request, a particular set of metadata about the device;
    wherein the particular set of metadata about the device indicates a plurality of capabilities specific to the device;
    selecting, from among a plurality of separately implemented packaging protocol modules, each having a same communication interface, and each being designed to package metadata according to a different packaging protocol, a particular packaging protocol module, wherein the particular packaging protocol module is designed to package metadata based on the particular packaging protocol and no other packaging protocol;
    sending the particular set of metadata to the particular packaging protocol module through the communication interface of the particular packaging protocol module to be packaged;
    wherein the particular packaging protocol module packages the particular set of metadata using the particular packaging protocol; and
    sending the packaged metadata, packaged by the particular packaging protocol module of the device, to the client to generate an interface specific for the device.

11. The computer-readable medium of claim 10, wherein the step of selecting the particular packaging protocol comprises:
  determining a particular standard to which the client conforms, wherein the particular standard is one of WSD and UPnP;
  locating, in the mapping table, a particular mapping;
  wherein the particular mapping identifies the particular standard; and
  selecting, as the particular packaging protocol, a packaging protocol identified in the particular mapping;
  wherein the particular set of metadata about the device further indicates a plurality of functions specific to the device.

12. The computer-readable medium of claim 11, wherein the particular packaging protocol is mapped to both WSD and in the mapping table.

13. The computer-readable medium of claim 10, wherein the particular retrieving protocol is mapped to multiple different packaging protocols in the mapping table maintained by the device.

14. The computer-readable medium of claim 10, wherein the step of selecting the particular retrieving protocol comprises:
  locating, in the mapping table, a characteristic associated with the metadata request; and
  selecting, as the particular retrieving protocol, a retrieving protocol identified in the particular mapping.

15. The computer-readable medium of claim 14, wherein the characteristic is an identity of a port on which the device received the metadata request.

16. The computer-readable medium of claim 14, wherein the characteristic is a control string contained within the metadata request.

* * * * *